United States Patent
Nakabayashi et al.

(10) Patent No.: US 9,224,512 B2
(45) Date of Patent: Dec. 29, 2015

(54) POSITIVE ELECTRODE ACTIVE MATERIAL FOR NON-AQUEOUS SECONDARY BATTERY AND MANUFACTURING METHOD THEREOF, AS WELL AS NON-AQUEOUS SECONDARY BATTERY USING POSITIVE ELECTRODE ACTIVE MATERIAL

(71) Applicant: Hitachi Metals, Ltd., Minato-ku, Tokyo (JP)

(72) Inventors: Takashi Nakabayashi, Tokyo (JP); Shin Takahashi, Tokyo (JP); Kan Kitagawa, Tokyo (JP); Toyotaka Yuasa, Tokyo (JP); Shuichi Takano, Tokyo (JP); Mitsuru Kobayashi, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/167,190

(22) Filed: Jan. 29, 2014

(65) Prior Publication Data

US 2014/0209832 A1 Jul. 31, 2014

(30) Foreign Application Priority Data

Jan. 30, 2013 (JP) ................. 2013-015969

(51) Int. Cl.
| | | |
|---|---|---|
| H01B 1/06 | (2006.01) | |
| H01M 4/58 | (2010.01) | |
| H01M 4/36 | (2006.01) | |
| H01M 4/62 | (2006.01) | |
| C01B 25/37 | (2006.01) | |
| C01B 25/45 | (2006.01) | |
| H01M 4/04 | (2006.01) | |

(52) U.S. Cl.
CPC ................ *H01B 1/06* (2013.01); *C01B 25/375* (2013.01); *C01B 25/45* (2013.01); *H01M 4/366* (2013.01); *H01M 4/5825* (2013.01); *H01M 4/625* (2013.01); *H01M 4/0471* (2013.01)

(58) Field of Classification Search
CPC ..... H01M 4/364; H01M 4/366; H01M 4/382; H01M 4/5825; H01M 4/587; H01M 4/625; H01M 4/0471; C01B 25/45; C01B 25/375; H01B 1/06
See application file for complete search history.

(56) References Cited

U.S. PATENT DOCUMENTS

2003/0064290 A1  4/2003  Li
2009/0186277 A1* 7/2009  Beck .................. H01M 4/5825
                                          429/221

(Continued)

FOREIGN PATENT DOCUMENTS

JP    2002-151072 A    5/2002
JP    2006-302671 A    11/2006

(Continued)

*Primary Examiner* — Mark Kopec
*Assistant Examiner* — Matthew R Diaz
(74) *Attorney, Agent, or Firm* — Crowell & Moring LLP

(57) ABSTRACT

A positive electrode active material for a non-aqueous secondary battery having high capacity and high rate characteristics is intended to be provided. Further, a positive electrode for a non-aqueous secondary battery and a non-aqueous secondary battery are intended to be provided by using the positive electrode active material. The positive electrode active material for the non-aqueous secondary battery contains a lithium composite oxide having an olivine structure represented by the chemical formula: $Li_{1+A}Mn_XM_{1-X}(PO_4)_{1+B}$ in which A>0, B>0, M represents a metal element, M in the chemical formula is one or more metal elements selected from Fe, Ni, Co, Ti, Cu, Zn, Mg, V, and Zr, the ratio A/B in the chemical formula is within a range of: $2<A/B\leq7$, and the value of X is within a range of: $0.3\leq X<1$.

13 Claims, 13 Drawing Sheets

(56) References Cited

U.S. PATENT DOCUMENTS

2011/0012067 A1* 1/2011 Kay ............................ 252/507
2011/0052988 A1* 3/2011 Beck et al. .................... 429/221
2014/0138591 A1* 5/2014 Yoon et al. ............... 252/519.14

FOREIGN PATENT DOCUMENTS

| JP | 2008-159495 A | | 7/2008 |
|---|---|---|---|
| WO | WO 2013016426 A1 | * | 1/2013 |
| WO | WO 2013052494 A1 | * | 4/2013 |

\* cited by examiner

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL

POSITIVE ELECTRODE ACTIVE MATERIAL FOR NON-AQUEOUS SECONDARY BATTERY AND MANUFACTURING METHOD THEREOF, AS WELL AS NON-AQUEOUS SECONDARY BATTERY USING POSITIVE ELECTRODE ACTIVE MATERIAL

BACKGROUND OF THE INVENTION

1. Field of the Invention

The present invention concerns a positive electrode active material for a non-aqueous secondary battery and a manufacturing method thereof, as well as a positive electrode for a non-aqueous secondary battery and a non-aqueous secondary battery using the positive electrode active material.

2. Description of the Related Art

As a non-aqueous secondary battery, a lithium ion secondary battery using a non-aqueous electrolyte and using lithium ions for charge/discharge reaction has been put to practical use. The lithium ion secondary battery has higher energy density compared with a nickel hydrogen battery, etc. and has been used, for example, as a power source for portable electronic equipment. In recent years, the lithium ion secondary battery has been further used in medium- and large-scale applications such as hybrid cars, electric cars, stationary uninterruptible power supplies, power leveling applications, etc. On the other hand, improvement of safety is necessary for the lithium ion secondary battery from a viewpoint of suppressing heat generation and ignition.

At present, layered oxide type positive electrode active materials such as $LiCoO_2$ have been used as the positive electrode active material. In the layered oxide type positive electrode material, lithium (Li) atoms per se support the crystal structure and when Li atoms are deintercalated by charging, the structure becomes instable. Further, when the battery is overcharged and the Li atoms supporting the Li layer are deintercalated excessively, the structure may possibly be broken to release oxygen and result in heat generation and ignition.

In view of the above, keen interest has been directed to an olivine type positive elective material represented by $LiMPO_4$ (M represents metal) having an olivine structure of excellent safety. Since the olivine type positive electrode active material has the olivine structure, the structure remains stable even when Li atoms are deintercalated by charging and, since oxygen and phosphorus are in a covalent bond, oxygen is less likely to be released to provide high safety.

As the olivine type positive electrode active material, an olivine iron type positive electrode material having iron as a constituent element and an olivine manganese type positive electrode active material having manganese as a constituent element have been known. The olivine iron type positive electrode active material has been put to practical use. However, since the reaction potential is as low as 3.4 V (vs. $Li/Li^+$), the energy density is low and electroconductivity and Li ion diffusibity are low. On the other hand, the olivine manganese type positive electrode active material attracts attention since the material has a reaction potential as high as 4.1 V (vs. $Li/Li^+$) and high energy density. However, the olivine-manganese type positive electrode active material has lower electroconductivity and Li ion diffusibility compared with the olivine iron type positive electrode active material and, accordingly, the capacity and the rate characteristics are low.

In view of the above, Japanese Patent Application Laid-Open (JP-A) No. 2008-159495 proposes a method of increasing the specific surface area thereby increasing the capacity of the olivine type positive electrode active material in order to improve the reactivity with the electrolyte thereby improving the Li diffusibity.

JP-A No. 2006-302671 proposes a method of covering the surface of the olivine type positive electrode active material by a carbon material, and enhancing the crystallinity of the carbon layer and improving the electroconductivity, thereby increasing the capacity.

JP-A No. 2002-151072 proposes a method of incorporating Li excessively in the olivine manganese type positive electrode active material thereby diluting the Jahn-Teller effect caused by $Mn^{3+}$ which is formed during charging thereby suppressing the strain of a crystal structure and suppressing lowering of the capacity.

SUMMARY OF THE INVENTION

However, the methods proposed by the patent references described above concern improvement of capacity. For example, JP-A No. 2006-302671 has no descriptions concerning rate characteristics. Further, it has no descriptions concerning the ratio of excess Li-amount (lithium) and excess P-amount (phosphorus). The method of improving the rate characteristics simultaneously with the capacity is not found therein. Accordingly, existent lithium ion secondary batteries using olivine manganese type positive electrode active material involve a problem that the capacity is low and current density is low during discharging thereby lowering the rate characteristics.

In view of the problems described above, the present invention has been accomplished and intends to provide a positive electrode active material for a non-aqueous secondary battery having a high capacity and high rate characteristics. In addition, the invention also intends to provide a non-aqueous secondary battery by using the positive electrode active material.

In order to address the problem described above, the positive electrode active material for the non-aqueous secondary battery according to the invention has the following main feature.

A positive electrode active material for a non-aqueous secondary battery containing a lithium composite oxide having an olivine type structure represented by a chemical formula $Li_{1+A}Mn_XM_{1-X}(PO_4)_{1+B}$ (where A>0, B>0, and M represents a metal element). In the chemical formula, M represents one or more metal elements selected from Fe, Ni, Co, Ti, Cu, Zn, Mg, V, and Zr, the ratio of A to B in the chemical formula is within a range of: $2<A/B\le7$, and the value X is within a range of: $0.3\le X<1$.

According to an aspect of the present invention, the positive electrode active material for the non-aqueous secondary battery is fine and highly crystalline and can provide a high capacity and high rate characteristics. Further, the positive electrode for the non-aqueous secondary battery and the non-aqueous secondary battery having a high capacity and high rate characteristics can be obtained by using the positive electrode active material.

DETAILED DESCRIPTION OF THE PREFERRED EMBODIMENTS

Figure 1:
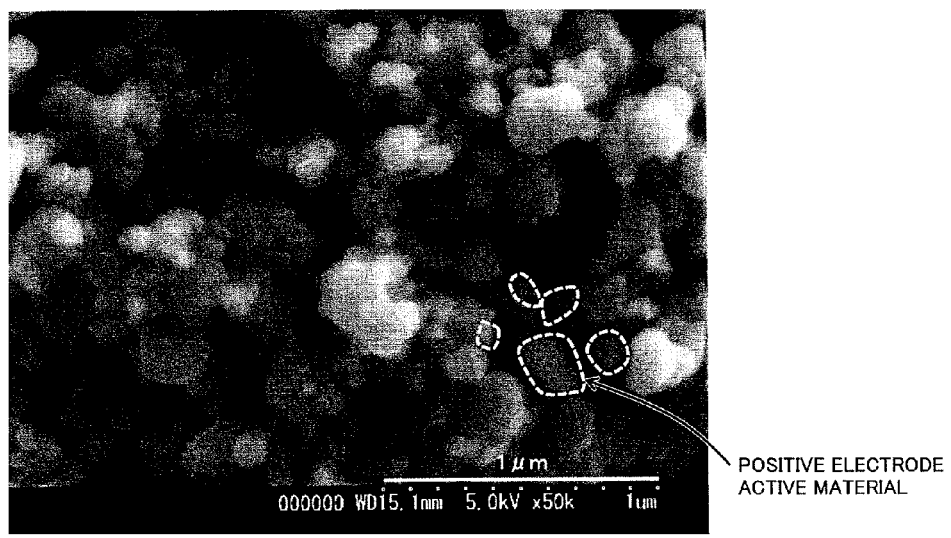
FIG. 1 is a photograph of scanning electron microscope of a positive electrode active material (SEM image) in Example 1.

The present invention is to be described specifically by way of preferred embodiments.

<Positive Electrode Active Material>

The positive electrode active material for the non-aqueous secondary battery of the present invention contains a lithium composite oxide having an olivine structure represented by a chemical formula: $Li_{1+A}Mn_XM_{1-X}(PO_4)_{1+B}$ (where $A>0$, $B>0$, $2<A/B\leq7$, $0.3\leq X<1$, and M is one or more metal elements selected from Fe, Ni, Co, Ti, Cu, Zn, Mg, V, and Zr). Further, A/B in the formula represents excess Li-amount/excess P-amount (A/B), which is a ratio for the excess Li-amount (shown by A in the formula) and excess P-amount (shown by B in the formula) and they take values within a range of: $2<A/B\leq7$.

The excess Li-amount and the excess P-amount show compositional amounts which are excessive to respective compositions of Li and P determined stoichiometrically in view of the chemical formula.

A correlationship exists between A/B and the particle diameter, and a fine positive electrode active material can be obtained within the range described above, to provide a high capacity and high rate characteristics. Further, the ratio is preferably $2.2\leq A/B\leq5$ and a further higher capacity and higher rate characteristics can be provided within the range described above.

Li and P are more than 100 mol % based on the total mol number of Mn and other metal, respectively. When Li and P are within the range of A/B described above, the lithium composite oxide can take an olivine structure and prevent metals from being formed as by-products. Accordingly, precipitation of metal obstacles at the negative electrode can be prevented to inhibit short circuit and improve safety.

P is preferably 115 mol % or less based on the total mol number of Mn and other metal for the following reason. If the amount of P is more than 115% based on the total mol number of Mn and other metal, ingredients inert to Li ions are increased to lower the theoretical capacity, and even if an actual capacity approximate to the theoretical capacity is obtained, the capacity is lowered, which is not preferred. Accordingly, B in the chemical formula: $Li_{1+A}Mn_XM_{1-X}(PO_4)_{1+B}$ is preferably equal to or less than 15%, that is, B is in a range of: $B\leq0.15$.

Further, X in the chemical formula: $Li_{1+A}Mn_XM_{1-X}(PO_4)_{1+B}$ has a value within a range of $0.3\leq X<1$ for the following reasons. When X is 0.3 or more, the potential is high and high energy density is obtained. Further, when X is less than 1, since the Jahn-Teller effect can be diluted, the high capacity can be obtained.

Further, M is one or metal elements selected from Fe, Ni, Co, Ti, Cu, Zn, Mg, V, and Zr. When M is one or more metal elements selected from Fe, Ni, Co, Ti, Cu, Zn, Mg, V, and Zr, the Jahn-Teller effect can be diluted to preferably suppress the strain of the crystal structure and increase the capacity. For M, Ni and Co capable of obtaining a high potential are preferred. When Fe is used as M, electroconductivity and Li ion diffusibity can be improved to desirably improve the charge/discharge cycle characteristics. Further, V having a high Jahn-Teller effect diluting effect is preferred as M. This further increases the capacity. When V is selected as one of the metal elements, M preferably comprises two or more of metal elements containing M'. M' is one or more of metals selected from Fe, Ni, Co, Ti, Cu, Zn, Mg, and Zr.

Further, in the positive electrode active material, the ratio (d/D) of the particle diameter (hereinafter referred to as d) to the crystallite diameter determined from the half-width obtained by X-ray diffraction (hereinafter referred to as D) is preferably 1 or more and 1.35 or less. When d/D is 1.35 or less, since the crystallinity of $Li_{1+A}Mn_XM_{1-X}(PO_4)_{1+B}$ is favorable and contains fewer defects, Li ion diffusibity is enhanced to provide a high capacity. The crystallite diameter D is not larger than the grain size diameter d and, since the crystallite diameter D at the maximum agrees with the particle diameter d, the minimum value of d/D is 1. Accordingly, the crystallinity is improved more as d/D approaches to 1.

Definitions for the particle diameter d and the crystallite diameter D are to be described below.

The particle diameter is a mean particle diameter which is obtained as a result of observing the positive electrode active materials sampled at random by using a scanning electron microscope (SEM) or a transmission electron microscope (TEM) and observing them for three or more view fields selected at random. Since the shape of individual particle is not a perfectly spherical, a mean value of the major diameter and the minor diameter of particles in SEM or TEM images is defined as a particle diameter. The mean particle diameter is a mean value determined by sampling the particles by the number of 40 in each of the view fields successively from those having a particle diameter nearer to a medium value and determined from the particle diameter of all of particles sampled for three or more view fields.

Next, the crystallite diameter D is a physical property determined from the half-width in the result of X-ray diffractiometry (XRD). XRD measurement is performed by a concentration method using a CuKα radiation as X-line at an output of 40 kV and 40 mA. Measurement is carried out under the condition at a step width of 0.03° (degree) for a measuring time per one step of 15 sec and, after smoothing the measured data by a Savitzky-Goley method, the background and $K\alpha_2$ radiation are removed and the half-width $\beta_{exp}$ of the (101) peak (space group: as $P_{mna}$) is determined. Further, a standard Si sample (NIST standard sample 640d) is measured by one apparatus and under identical conditions, and the half-width $\beta_1$ of the peak is determined and the half-width data is defined by $$\beta=\sqrt{\beta_{exp}^2-\beta_t^2}$$ [Formula 1]

The crystallite diameter D is determined by using the half-value β and using the following Scherrer's equation (2):

$$D = \frac{K\lambda}{\beta\cos\theta}$$ [Formula 2]

In the formula, λ is a wavelength of an X-ray source, θ is a reflection angle, k is a Scherrer's constant at K=0.9.

The positive electrode active material of the invention is preferably covered at the surface of the lithium composite oxide partially or entirely by a conductive material. This is because the electroconductivity is improved when the surface of the lithium composite oxide is partially or entirely covered by the conductive material. Further, the conductive material is preferably a carbon material. That is, the electroconductivity is preferably increased by covering the surface of the lithium composite oxide partially or entirely by the carbon material.

It is not necessary that the carbon material entirely comprises the carbon material but a portion of the material may comprise a material other than the carbon material.

The carbon content of the positive electrode active material is preferably 0.5 mass % or more and less than 30 mass % or less. When the carbon content is 0.5 mass % or more, preferred electroconductivity can be obtained to increase the capacity. The carbon content is particularly preferably 1 mass % or more. When the carbon content is 1 mass % or more, the electroconductivity is enhanced to improve rate characteristics. On the contrary, if the carbon content exceeds 30 mass %, a battery capacity is lowered.

Further, the carbon content is more preferably 5 mass % or less. When the carbon content is 5 mass % or less, lowering of the electrode capacity can be suppressed more effectively.

The particle diameter of the positive electrode active material is preferably 10 nm or more and 500 nm or less by the following reasons. If the particle diameter d is less than 10 nm, the apparent density is high and the capacity per unit volume is decreased. The particle diameter d is defined as 500 nm or less, because if the particle diameter d exceeds 500 nm, diffusion path of Li ions becomes longer to increase the resistance and lower the capacity. Particularly, it is more preferred that the particle diameter is 30 nm or more and 200 nm or less. In a case where the positive electrode active material is not agglomerated as primary particles but in a mono-dispersed state, when the particle diameter is 30 nm or more and 200 nm or less, the capacity is increased and high temperature storage characteristics are improved. The positive electrode active material may be agglomerated to secondary particles by pelleting or the like.

<Manufacturing Method of Positive Electrode Active Material>

Figure 24:
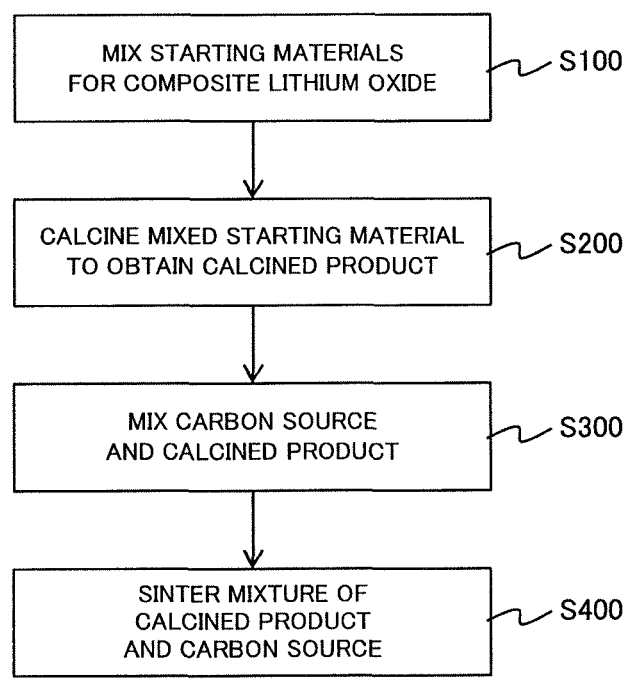
FIG. 24 is a flow chart illustrating manufacturing steps of the positive electrode active material of the present invention.

FIG. 24 is a flow chart illustrating manufacturing steps of the positive electrode active material for the non-aqueous secondary battery described above. The positive electrode active material can be manufactured by the method shown in FIG. 24 including a step (S100) of mixing starting materials for lithium composite oxide, a step (S200) of pre-calcining the mixed starting materials, a step (S300) of mixing the calcined product and a carbon source, and a step (S400) of actual-calcining the mixture of the calcined product and the carbon source.

The actual-calcining temperature in the actual-calcining step is preferably a crystallization temperature of the lithium composite oxide or higher and at a crystallization temperature +400° C. or lower. When the actual-calcining step is performed at the crystallization temperature +400° C. or lower, grain growing can be suppressed to obtain a positive electrode active material of small particle diameter. Further, since the particles are sintered at a low temperature, the manufacturing cost is decreased.

The carbon source to be mixed with the calcined product can be selected optionally from saccharides such as sucrose, lactose, maltose, trehalose, turanose, cellobiose, glucose, glycogen, starch, cellulose, and dextrin, and pitch type carbonaceous materials. Further, the mixing amount can be determined considering the carbon content described above.

<Positive Electrode for Non-aqueous Secondary Battery>

A positive electrode for a non-aqueous secondary battery at a high capacity and high rate characteristics can be manufactured by using the positive electrode active material for the non-aqueous secondary battery according to the invention. The positive electrode can be prepared by the method known so far. Specifically, slurry of a positive electrode mix is prepared, for example, by kneading the positive electrode active material described above, a conductive material, and a binder, and optionally diluting them with addition of a dispersing solvent such as N-methylpyrrolidone. After coating the positive electrode mix slurry to the surface of an aluminum foil or the like used as a positive electrode collector, it is dried and pressed by a press roller thereby forming a layer of the positive electrode mix on the collector to manufacture a positive electrode.

While the binder is not particularly restricted, polyvinylidene fluoride, polyacrylonitrile, modified polyacrylonitrile, and styrene-butadiene rubber, etc. can be used.

As the conductive material, for example, carbon materials such as graphite, acetylene black, carbon black, carbon fiber, and metal carbide can be used, which may be used each alone or two or more of them may be used in admixture.

<Non-aqueous Secondary Battery>

A non-aqueous secondary battery of a high capacity and high rate characteristics can be obtained by using the positive electrode described above. Usual configuration known so far can be adopted as the configuration of the non-aqueous secondary battery.

Figure 23:
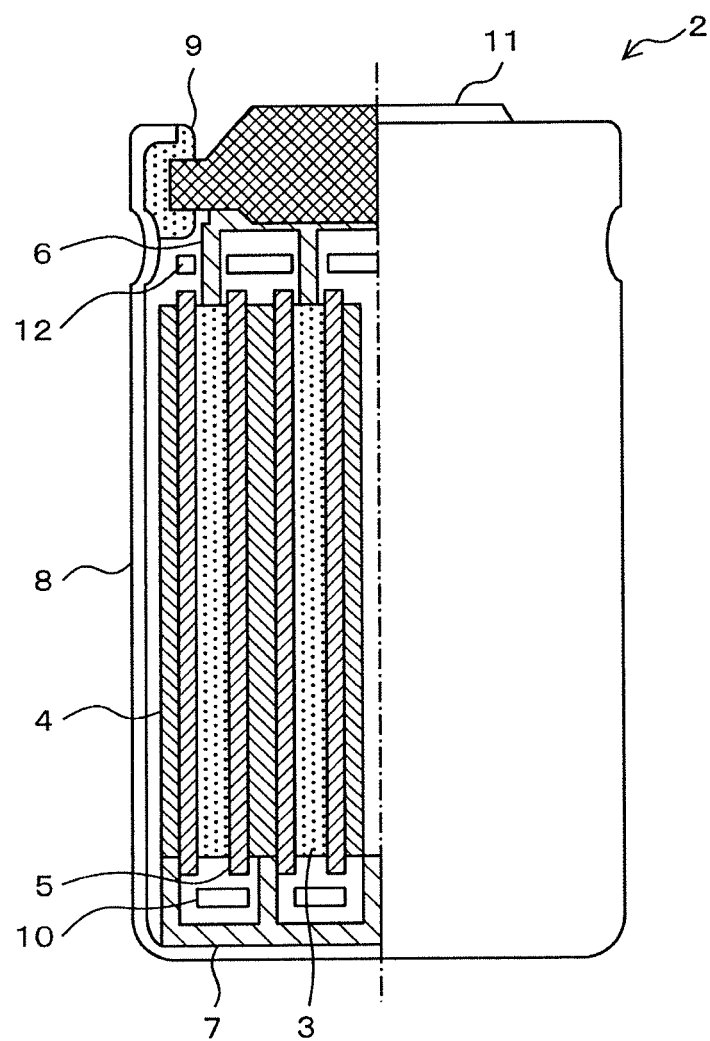
FIG. 23 is a fragmentary cross sectional view of a preferred embodiment of a non-aqueous secondary battery of the present invention.

FIG. 23 is a fragmentary cross sectional view of a preferred embodiment of the non-aqueous secondary battery according to the invention. In a non-aqueous secondary battery 2 in FIG. 23, a separator 5 is disposed between a positive electrode 3 and a negative electrode 4. The positive electrode 3, the negative electrode 4, and the separator 5 are wound around and sealed together with a non-aqueous electrolyte (not shown) in a battery can 8 made of stainless steel or aluminum.

A positive electrode lead 6 is attached to the positive electrode 3 and a negative electrode lead 7 is attached to the negative electrode 4 and they are adapted respectively so as to take out current. An insulation plate 10 is provided between the positive electrode 3 and the negative electrode lead 7 and between the negative electrode 4 and the positive electrode lead 6 respectively. A packing 9 is provided between a battery can 8 which is in contact with the negative electrode lead 7 and a sealing lid 11 which is in contact with the positive electrode lead 6 for prevention leakage of the electrolyte and separating the positive electrode and the negative electrode.

EXAMPLES

The present invention is to be described more in details by way of examples and comparative examples but the invention is not restricted to them.

Example 1

Ferric citrate ($FeC_6H_5O_7 \cdot nH_2O$), manganese acetate tetrahydrate ($Mn(CH_3COO)_2 \cdot 4H_2O$), lithium dihydrogen phosphate, and lithium acetate were added to a pot made of zirconia and acetone was further added and they were pulverized and mixed using a planetary ball mill. The obtained slurry was dried to obtain a starting powder. The starting powder was calcined to obtain a calcined product.

The obtained calcined product and sucrose as a carbon source were mixed. The obtained powder mixture was sintered at 700° C. for 10 hours to prepare an aimed positive electrode active material. The actual-calcining temperature upon actual-calcining corresponds to a temperature higher by 300° C. than the crystallization temperature of the lithium composite oxide as a core material.

When the obtained positive electrode active material was measured by XRD, it was a lithium composite oxide having an olivine structure represented by chemical formula: LiMnFePO$_4$ as a core material and the surface was covered by the carbon material when measured by Raman spectroscopy.

The obtained positive electrode active material was put to elemental analysis by high frequency inductively coupled plasma Atomic Emission Spectroscopy (ICP-AES). The amount of the transition metal elements (Mn and Fe) in total was assumed as 1 and the molar ratios of Li, P, Mn, and Fe are indicated as Li amount, P amount, Mn amount, and Fe amount respectively and shown in Table 1. Further, the ratio (A/B) of excess Li-amount/excess P-amount is shown in the next to the rightmost column of Table 1. While A/B values shown in Table 1 are described in the order of Examples 1 to 16 and Comparative Examples 1 to 7, when they are rearranged in the order of Comparative Examples 1 to 4, Examples 1 to 16 and Comparative Examples 5 to 6, they are arranged in the order from those at smaller A/B ratio to those at larger A/B ratio. The carbon content of the obtained positive electrode active material was 3.7 mass %.

Then, the positive electrode active material was observed further under scanning microscope SEM and the result (SEM image) is shown in FIG. 1. The particles of the observed positive electrode active material are shown as being surrounded by outlined dotted lines in the SEM image of FIG. 1. According to the result of SEM observation, the particle diameter d was 112 nm.

Examples 2 to 16

In the examples of Examples 2 to 16, positive electrode active materials were prepared respectively by the same method as in Example 1 described above except for changing the amount of lithium dihydrogen phosphate and lithium acetate. The positive electrode active materials obtained in the examples were put to elemental analysis by ICP-AES and the results are shown on respective examples in Table 1.

Figure 2:
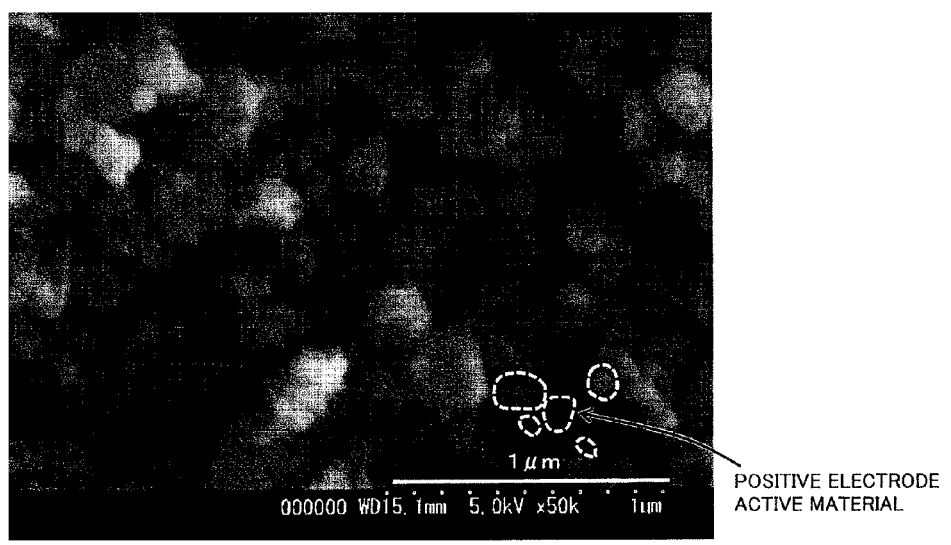
FIG. 2 is a photograph of scanning electron microscope of a positive electrode active material (SEM image) in Example 2.

Further, FIG. 2 to FIG. 16 illustrate SEM images of positive electrode active materials corresponding to Examples 2 to 16 respectively. That is, a SEM image of the positive electrode active material in Example 2 is shown in FIG. 2 and SEM images of the positive electrode materials of Examples 3 to 16 are shown in FIG. 3 to FIG. 16 respectively in the same manner. The carbon content obtained in these examples were 3.6 mass % to 3.7 mass %. It is considered that the surface of the lithium composite oxide is covered partially or entirely by the carbon material.

Further, the positive electrode active material obtained in Example 5 had a particle diameter d of 40 nm, a crystallite diameter D of 33 nm, and a d/D ratio of 1.2 according to the result of observation under transmission microscope (TEM) and X-ray diffraction.

Examples 17 to 18

In Example 17, in the lithium composite oxide having the olivine structure represented by the chemical formula: $Li_{1+A}Mn_xM_{1-x}(PO_4)_{1+B}$ as the positive electrode active material for the non-aqueous secondary battery of the invention, the elements indicated by M in the chemical formula were added as Mg and V in addition to Fe so as to be in the compositional range as shown in Table 3. The positive electrode active material was prepared by the same method as in Example 1 except for changing the amount of Mg and V. Example 18 is identical with Example 17 except for adding Mg in addition to Fe but not adding V.

The positive electrode active materials obtained in the examples were put to elemental analysis by ICP-AES and the results for the respective examples are shown in Table 3. In this case, the total amount of transition metal elements (Mn, Fe, Mg, V) is assumed as 1 and the molar ratios of Li, P, Mn, Fe, Mg, and V are indicated as Li amount, P amount, Mn amount, Fe amount, Mg, amount, and V amount respectively. Further, the ratio (A/B) of the excess Li-amount/excess P-amount ratio is shown in the rightmost column in Table 3.

TABLE 3

| | Li Amount | P Amount | Mn Amount | Fe Amount | Mg Amount | V Amount | Excess Li-Amount/ Excess P-amount (A/B) |
|---|---|---|---|---|---|---|---|
| Example 17 | 1.101 | 1.033 | 0.78 | 0.19 | 0.01 | 0.01 | 3.06 |
| Example 18 | 1.110 | 1.032 | 0.79 | 0.19 | 0.01 | — | 3.44 |

Comparative Examples 1 to 6

In comparative examples of Comparative Examples 1 to 6, positive electrode active materials were prepared respectively in the same manner as in Example 1 described above except for changing the amount of lithium dihydrogen phosphate and that of lithium acetate. The carbon content in the positive electrode active material was 3.6 mass % to 3.7 mass %. The obtained positive electrode active materials were put to elemental analysis by ICP-AES and the results on respective comparative examples are shown in Table 1. Further, FIG. 17 to FIG. 22 illustrate SEM images of the positive electrode active materials corresponding to Comparative Examples 1 to 6 respectively. It is considered that the surface of the lithium composite oxide is covered partially or entirely by the carbon material.

Comparative Example 7

The positive electrode active material was prepared in Comparative Example 7 by the same method as in Example 1 except for changing the amount of lithium dihydrogen phosphate and lithium acetate and using argon as the atmosphere of calcination. Further, the carbon content in the positive electrode active material was 6.3 mass %.

The obtained positive electrode active material was put to elemental analysis by ICP-AES and the result is shown in Table 1. The obtained positive electrode active material had a particle diameter d of 35 nm, a crystallite diameter D of 22 nm, and a ratio d/D of 1.6.

TABLE 1

Figure 3:
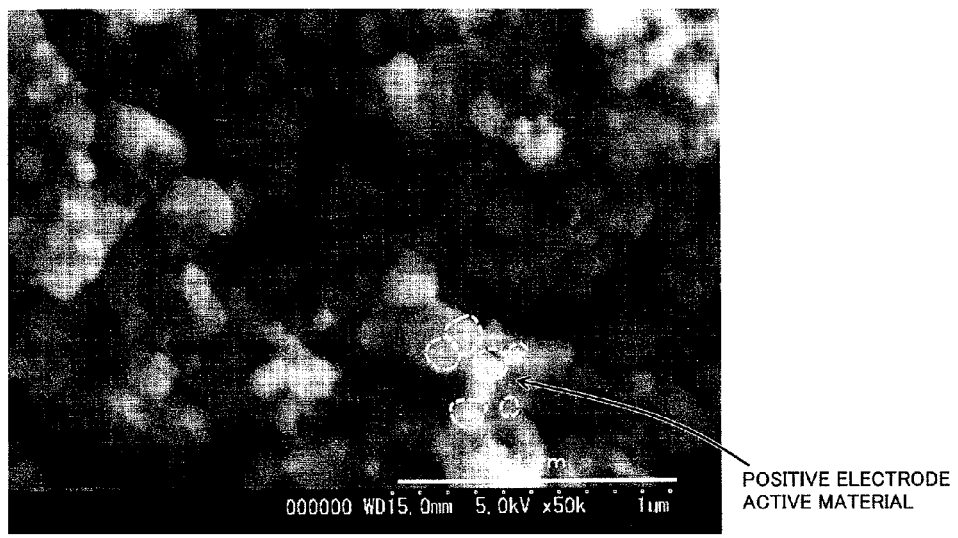
FIG. 3 is a photograph of scanning electron microscope of a positive electrode active material (SEM image) in Example 3.
Figure 4:
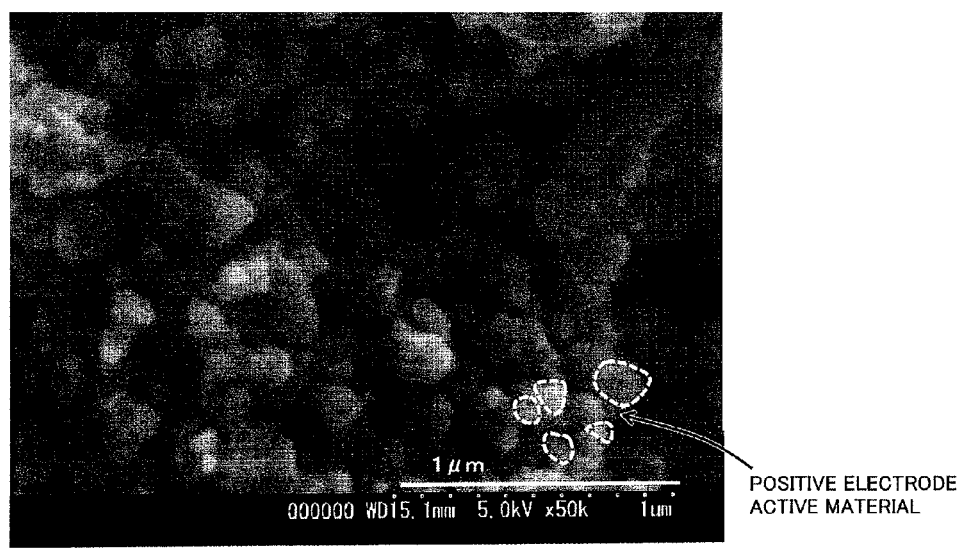
FIG. 4 is a photograph of scanning electron microscope of a positive electrode active material (SEM image) in Example 4.
Figure 5:
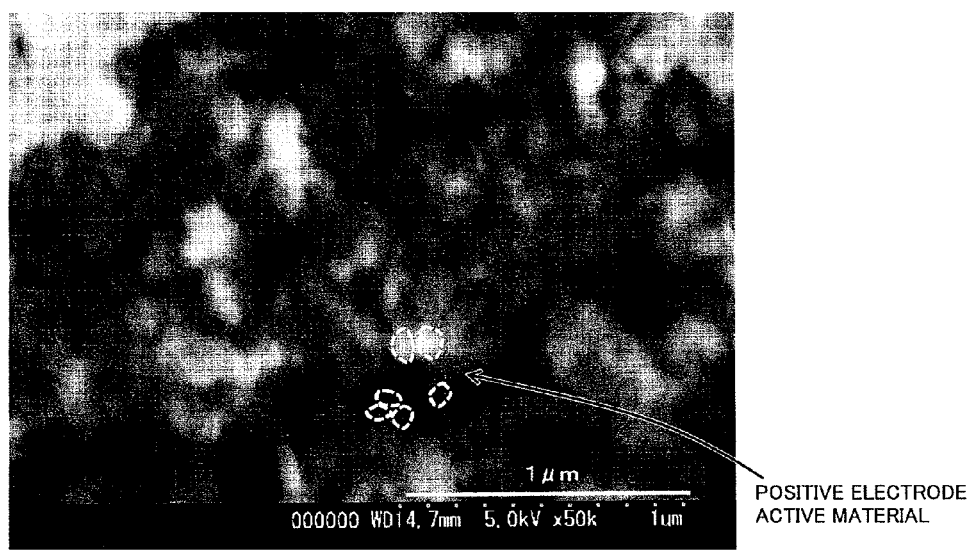
FIG. 5 is a photograph of scanning electron microscope of a positive electrode active material (SEM image) in Example 5.
Figure 6:
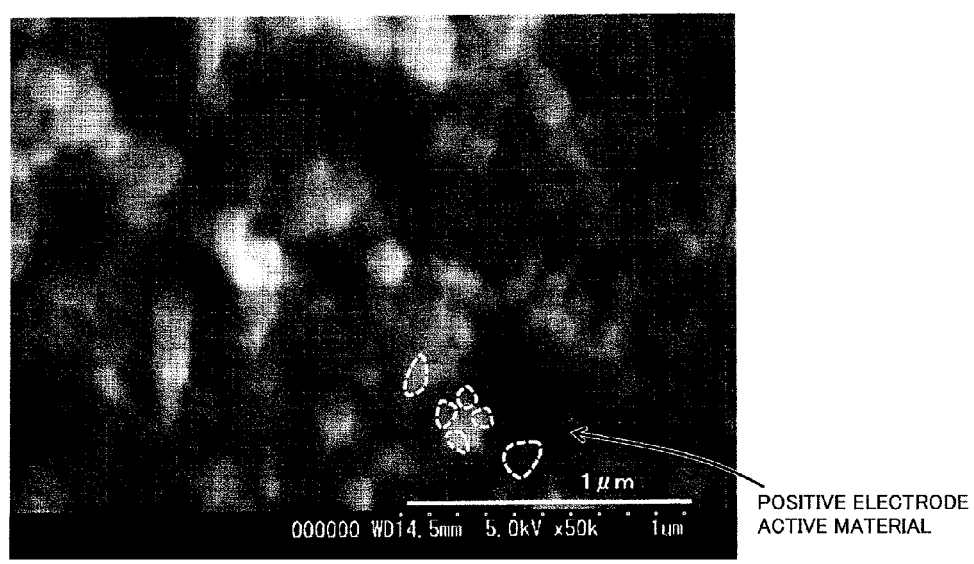
FIG. 6 is a photograph of scanning electron microscope of a positive electrode active material (SEM image) in Example 6.
Figure 7:
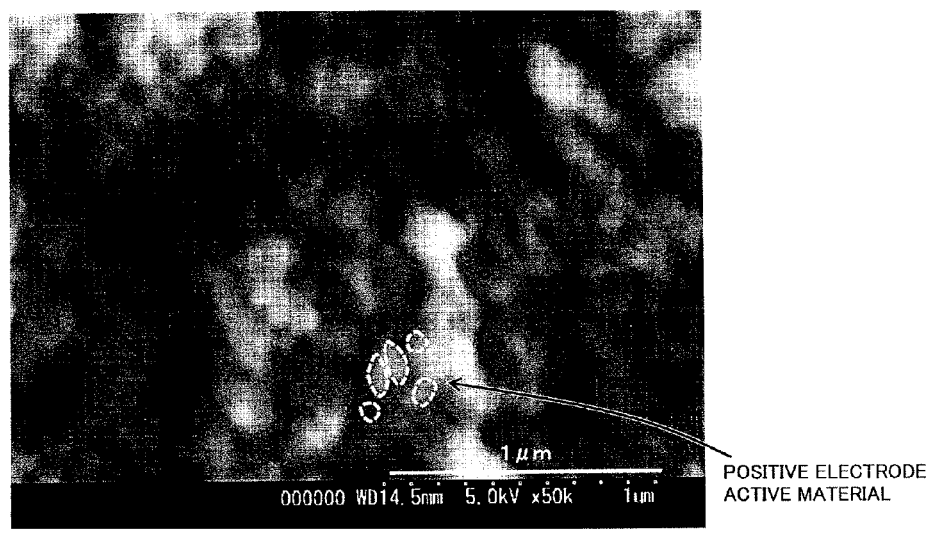
FIG. 7 is a photograph of scanning electron microscope of a positive electrode active material (SEM image) in Example 7.
Figure 8:
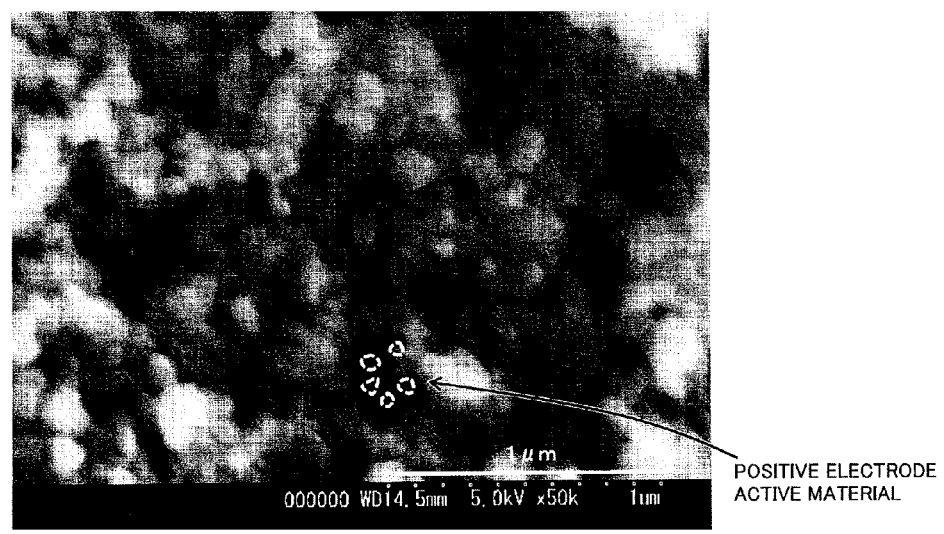
FIG. 8 is a photograph of scanning electron microscope of a positive electrode active material (SEM image) in Example 8.
Figure 9:
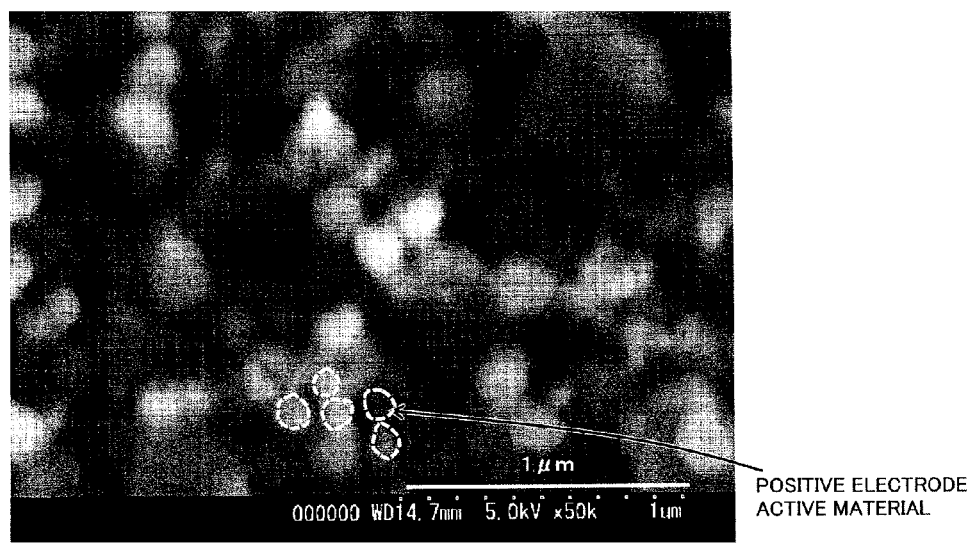
FIG. 9 is a photograph of scanning electron microscope of a positive electrode active material (SEM image) in Example 9.
Figure 10:
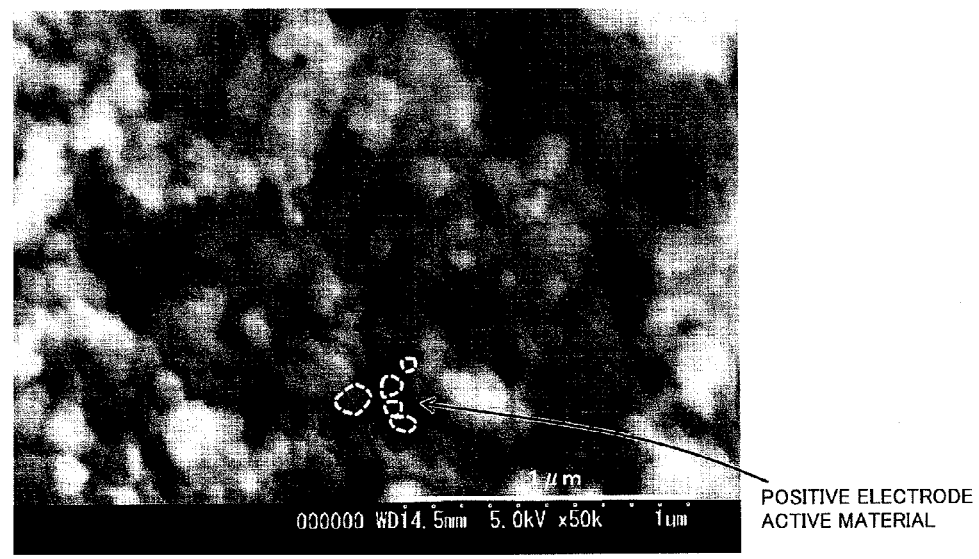
FIG. 10 is a photograph of scanning electron microscope of a positive electrode active material (SEM image) in Example 10.
Figure 11:
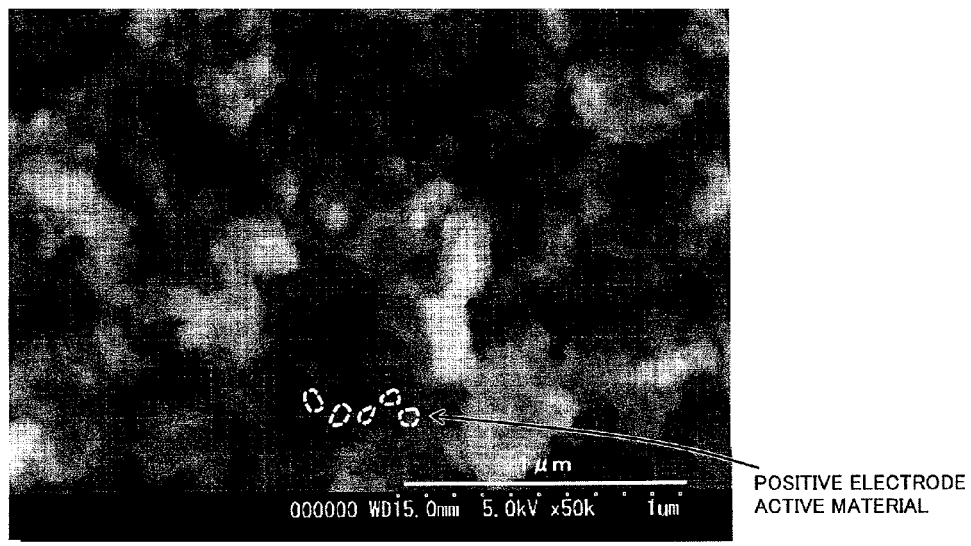
FIG. 11 is a photograph of scanning electron microscope of a positive electrode active material (SEM image) in Example 11.
Figure 12:
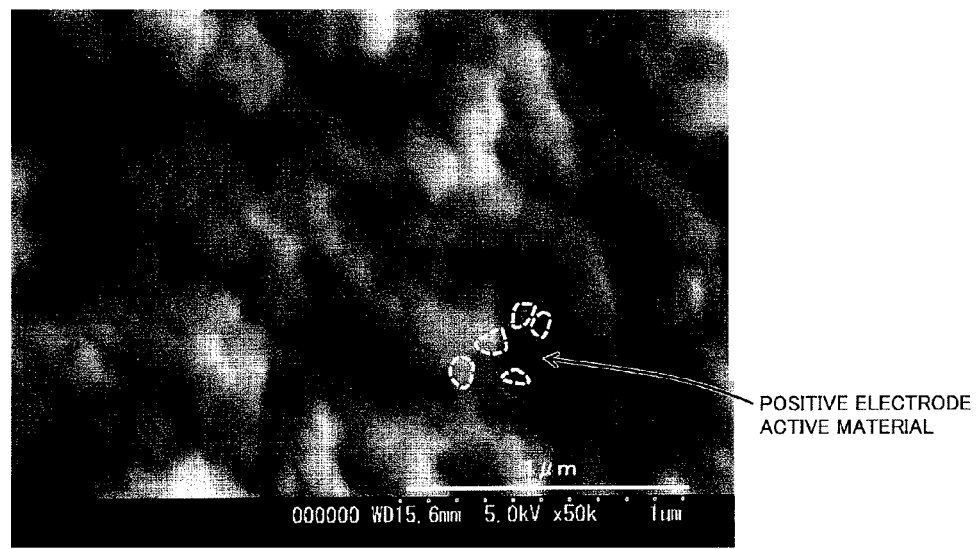
FIG. 12 is a photograph of scanning electron microscope of a positive electrode active material (SEM image) in Example 12.
Figure 13:
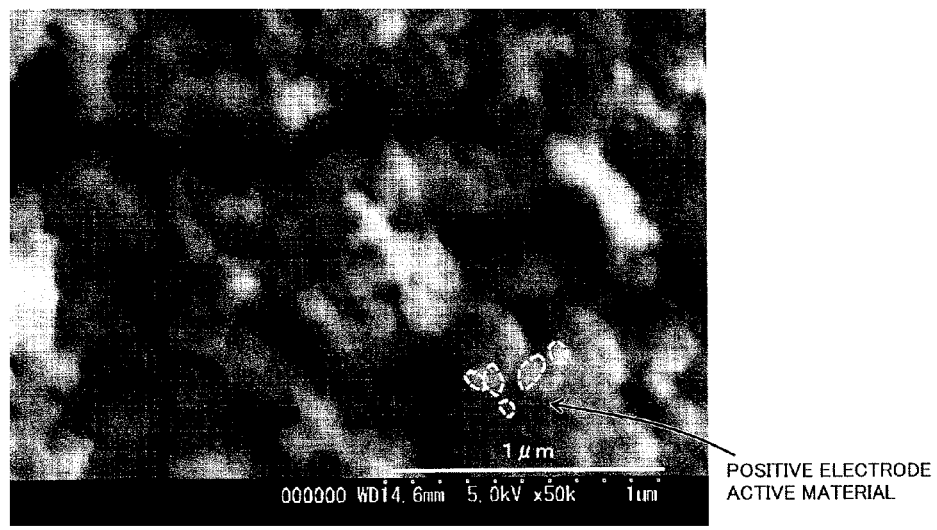
FIG. 13 is a photograph of scanning electron microscope of a positive electrode active material (SEM image) in Example 13.
Figure 14:
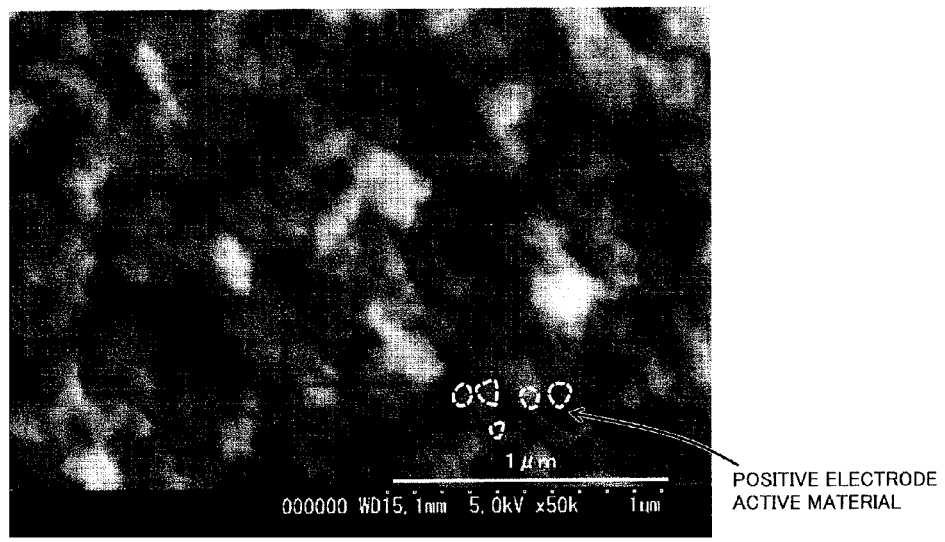
FIG. 14 is a photograph of scanning electron microscope of a positive electrode active material (SEM image) in Example 14.
Figure 15:
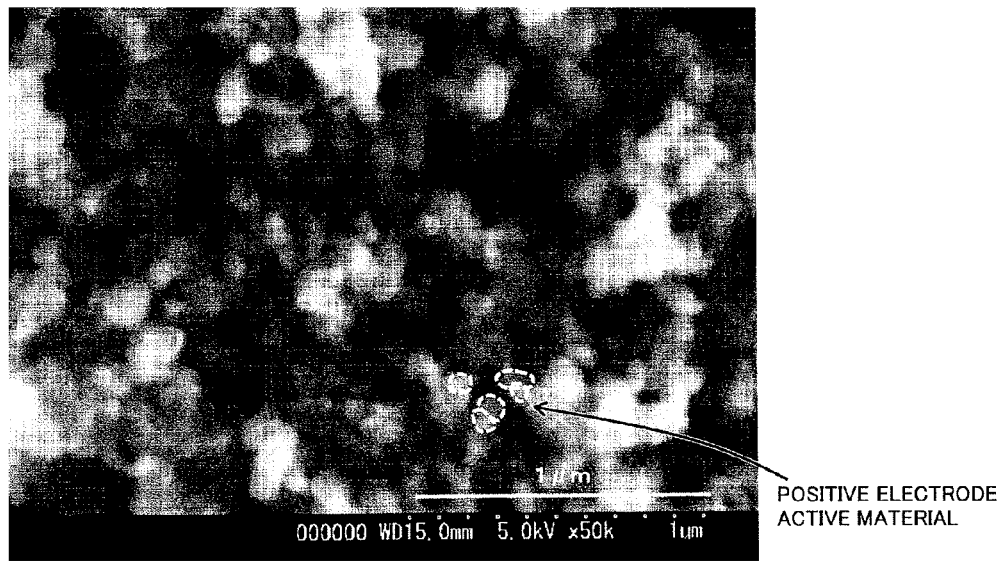
FIG. 15 is a photograph of scanning electron microscope of a positive electrode active material (SEM image) in Example 15.
Figure 16:
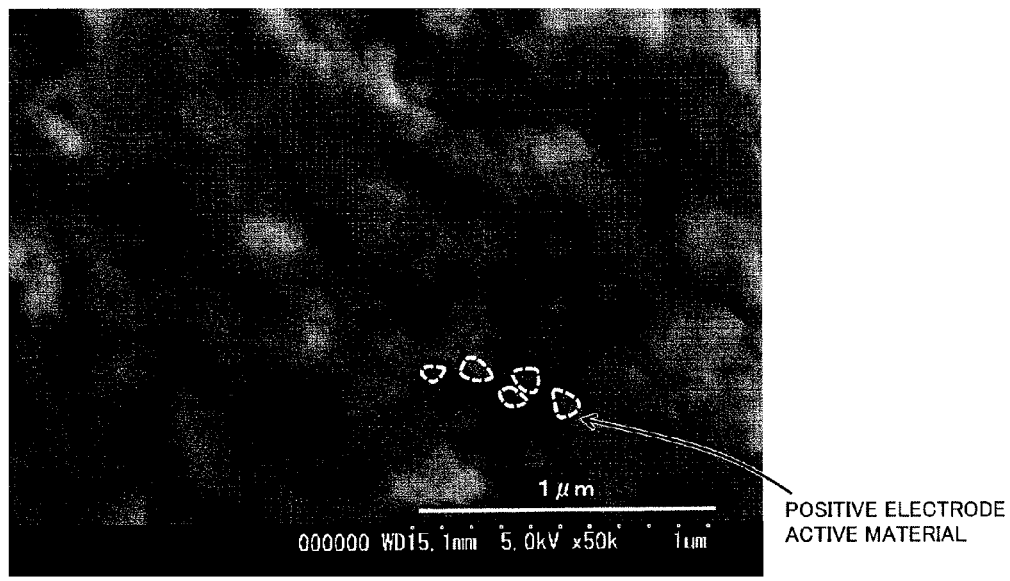
FIG. 16 is a photograph of scanning electron microscope of a positive electrode active material (SEM image) in Example 16.
Figure 17:
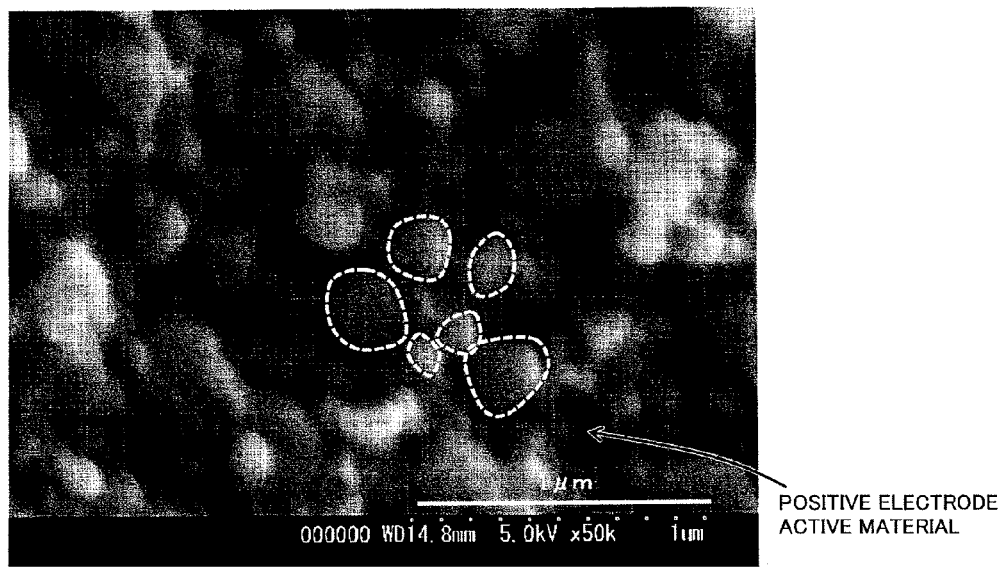
FIG. 17 is a photograph of scanning electron microscope of a positive electrode active material (SEM image) in Comparative Example 1.
Figure 18:
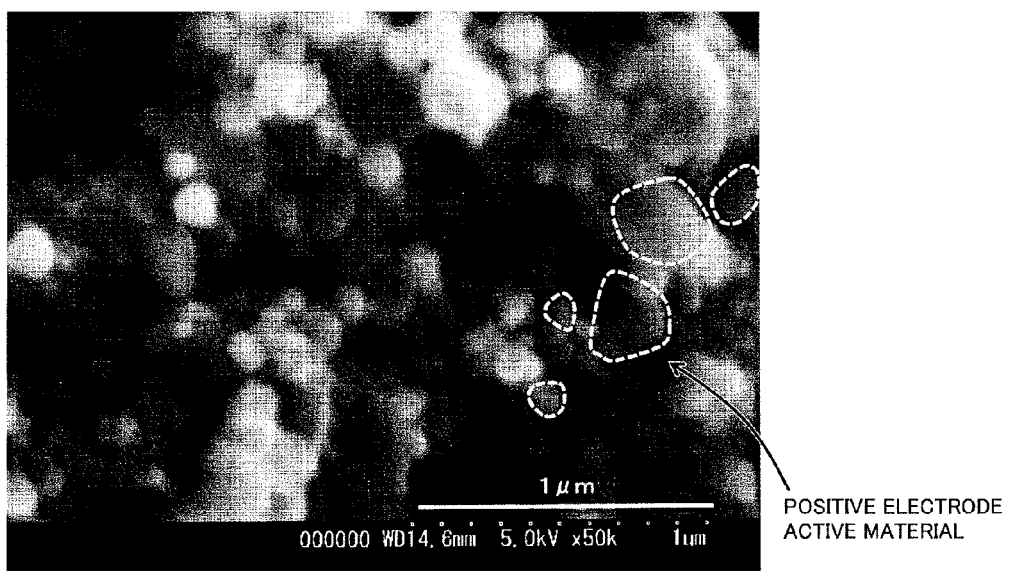
FIG. 18 is a photograph of scanning electron microscope of a positive electrode active material (SEM image) in Comparative Example 2.
Figure 19:
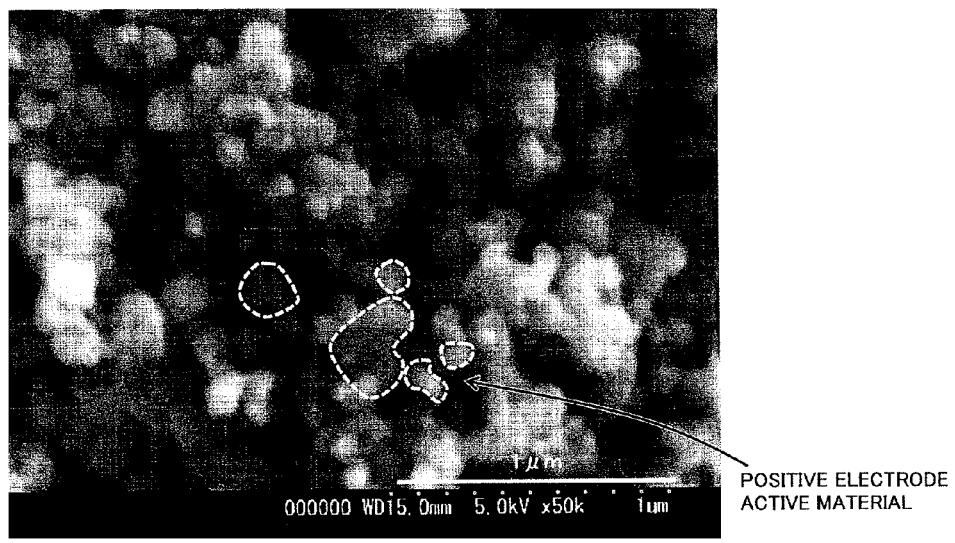
FIG. 19 is a photograph of scanning electron microscope of a positive electrode active material (SEM image) in Comparative Example 3.
Figure 20:
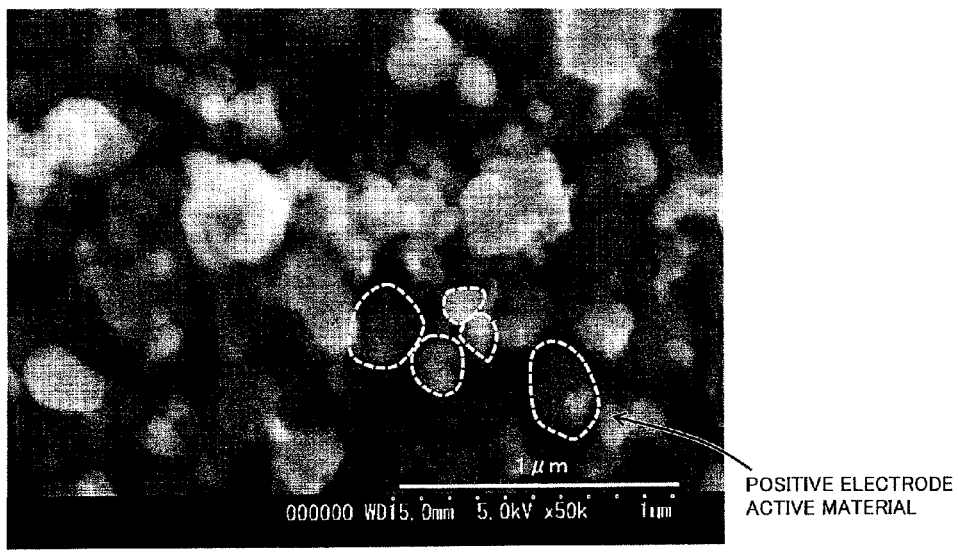
FIG. 20 is a photograph of scanning electron microscope of a positive electrode active material (SEM image) in Comparative Example 4.
Figure 21:
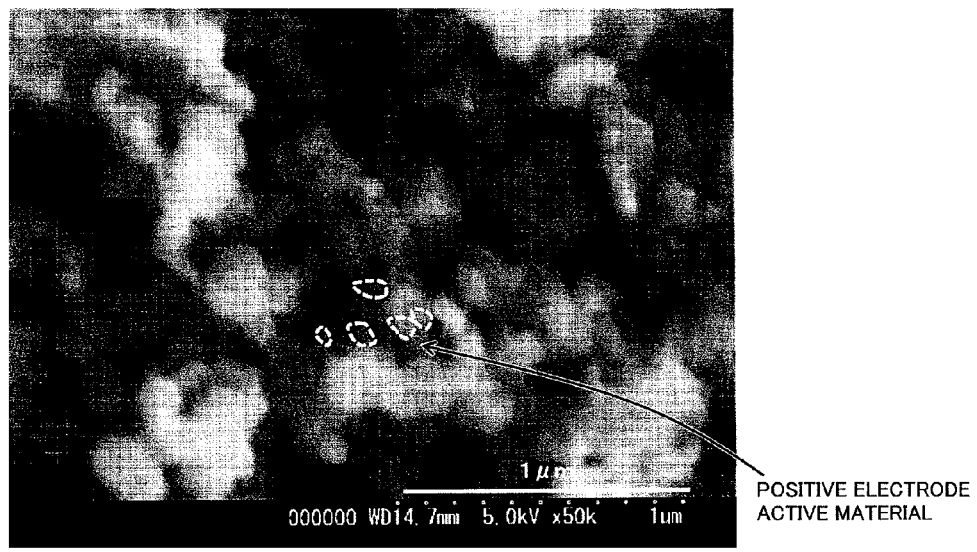
FIG. 21 is a photograph of scanning electron microscope of a positive electrode active material (SEM image) in Comparative Example 5.
Figure 22:
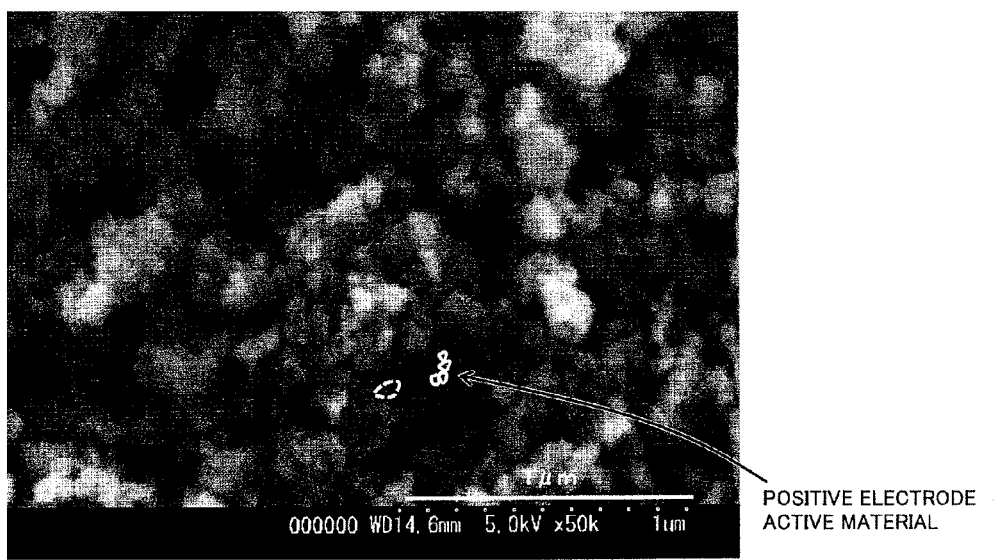
FIG. 22 is a photograph of scanning electron microscope of a positive electrode active material (SEM image) in Comparative Example 6.

| | Li Amount | P Amount | Mn Amount | Fe Amount | Excess Li-Amount/ Excess P-Amount (A/B) | Corresponding SEM Image (FIG. No.) |
|---|---|---|---|---|---|---|
| Example 1 | 1.049 | 1.023 | 0.79 | 0.21 | 2.16 | FIG. 1 |
| Example 2 | 1.177 | 1.080 | 0.79 | 0.21 | 2.22 | FIG. 2 |
| Example 3 | 1.201 | 1.088 | 0.79 | 0.21 | 2.27 | FIG. 3 |
| Example 4 | 1.149 | 1.061 | 0.79 | 0.21 | 2.46 | FIG. 4 |
| Example 5 | 1.106 | 1.043 | 0.80 | 0.20 | 2.47 | FIG. 5 |
| Example 6 | 1.079 | 1.031 | 0.80 | 0.20 | 2.51 | FIG. 6 |
| Example 7 | 1.162 | 1.062 | 0.80 | 0.20 | 2.63 | FIG. 7 |
| Example 8 | 1.179 | 1.064 | 0.79 | 0.21 | 2.82 | FIG. 8 |
| Example 9 | 1.102 | 1.036 | 0.80 | 0.20 | 2.82 | FIG. 9 |
| Example 10 | 1.107 | 1.033 | 0.80 | 0.20 | 3.24 | FIG. 10 |
| Example 11 | 1.146 | 1.040 | 0.80 | 0.20 | 3.63 | FIG. 11 |
| Example 12 | 1.049 | 1.012 | 0.80 | 0.20 | 4.02 | FIG. 12 |
| Example 13 | 1.137 | 1.033 | 0.80 | 0.20 | 4.18 | FIG. 13 |
| Example 14 | 1.129 | 1.028 | 0.80 | 0.20 | 4.53 | FIG. 14 |
| Example 15 | 1.115 | 1.022 | 0.81 | 0.19 | 5.27 | FIG. 15 |
| Example 16 | 1.157 | 1.024 | 0.80 | 0.20 | 6.51 | FIG. 16 |
| Comp. Example 1 | 1.105 | 1.098 | 0.80 | 0.20 | 1.07 | FIG. 17 |
| Comp. Example 2 | 1.103 | 1.079 | 0.80 | 0.20 | 1.30 | FIG. 18 |
| Comp. Example 3 | 1.048 | 1.034 | 0.80 | 0.20 | 1.43 | FIG. 19 |
| Comp. Example 4 | 1.092 | 1.051 | 0.79 | 0.21 | 1.81 | FIG. 20 |
| Comp. Example 5 | 1.109 | 1.014 | 0.80 | 0.20 | 7.69 | FIG. 21 |
| Comp. Example 6 | 1.138 | 1.018 | 0.80 | 0.20 | 7.81 | FIG. 22 |
| Comp. Example 7 | 1.080 | 1.075 | 0.80 | 0.20 | 1.07 | — |

In view of the values A/B in Table 1, A/B is within a range of 1 to 2 in Comparative Examples 1 to 4 and the value A/B is within a smaller range compared with Examples 1 to 16 in which A/B is within a range of 2 to 7. On the other hand, in view of the particle diameter of the positive electrode active material, it can be seen that the particle diameters shown by the SEM images in FIG. 17 to FIG. 20 corresponding to Comparative Examples 1 to 4 are apparently larger than the particle diameters shown by the SEM images in FIG. 1 to FIG. 16 corresponding to Examples 1 to 16. That is, it can be seen that the particle diameter is larger in Comparative Examples 1 to 4 having A/B smaller than that of Examples 1 to 16.

Further, as illustrated in FIG. 1 to FIG. 16 corresponding to Examples 1 to 16, it can be seen that the particle diameter tends to be smaller as the value A/B increases from 2 to 7 (refer to dotted white circles in each of the drawings). As illustrated in Table 1, in Examples 1 to 16 in which the ratio A/B of the excess Li-amount to the excess P-amount is within a range: 2<A/B≤7 according to elemental analysis on the positive electrode active material as illustrated in Table 1, the particle diameter is fine and the crystallinity is high as illustrated in the SEM images of FIG. 1 to FIG. 16 which are obtained corresponding to the respective examples.

As described above, it was found that there was a correlationship between the particle diameter and the ratio (A/B) of the excess Li-amount to the excess P-amount of the positive electrode active material as illustrated in FIG. 1 to FIG. 22 and the particle diameter was larger as the ratio A/B was smaller. That is, it was found that crystal growing is promoted more as the ratio A/B was smaller.

By the way, in view of the correlationship between the excess Li-amount and the particle diameter, the excess Li-amount (A), for example, between FIG. 1 and FIG. 12 is substantially identical. However, since the particle diameter is sufficiently larger in the former than that in the latter, it can be seen that the correlationship is not found between the excess Li-amount and the particle diameter.

On the other hand, in view of the correlationship between the excess P-amount and the particle diameter, the excess P-amounts (B) in FIG. 1, FIG. 15, and FIG. 16 are substantially identical. However, since the particle diameter in the former is sufficiently larger compared with that in the latter, it can be seen that no correlationship is found between the excess P-amount and the particle diameter.

In view of the above, no correlationship is found between the excess Li-amount (A) and the particle diameter and between the excess P-amount (B) and the particle diameter. Accordingly, for obtaining a positive electrode active material having desired characteristics, it may suffice that the range for the ratio (A/B) is specified, and it is not necessary to define the range for A or B.

<Positive Electrode Preparation Method>

82.5 parts by weight of the positive electrode active materials prepared in Examples 1 to 16 and Comparative Examples 1 to 7, 10 parts by weight of acetylene black (DENKA BLACK (registered trademark) manufactured by DENKI KAGAKU KOGYO KABUSHIKI KAISHA) as a conductive material, and solutions formed by dissolving 7.5 parts by weight of modified polyacrylonitrile as a binder in N-methylpyrrolidone were kneaded to prepare slurries of positive electrode mix. The obtained positive electrode mix slurries were coated uniformly over aluminum foils by using a coating machine. After drying in atmospheric air at 80° C., the foils were punched each into φ15 mm size (diameter) and pressed to obtain positive electrodes.

<Evaluation for Electrode Characteristics>

Electrode characteristics were evaluated for each of the positive electrodes prepared as described above. Vinylene carbonate was added to a mixed solvent of ethylene carbonate and ethyl methyl carbonate, to which 1M $LiPF_6$ was added and used as an electrolyte. Further, lithium metal was used as the negative electrode.

In a charge/discharge test, constant current/constant voltage charging was applied till 4.5 V (vs. $Li/Li^+$) and constant current discharging was performed till 2 V (vs. $Li/Li^+$). The charge/discharge current value was set to 0.1 C. The discharge capacity at the third cycle was defined as an initial discharge capacity. Further, a value obtained by dividing the initial discharge capacity by a theoretical capacity in the composition determined based on the result of elemental analysis and multiplying the quotient by 100 was defined as a discharge capacity rate. Further, the discharge capacity was defined as 5 C discharge capacity when measured at a charge current value of 0.1 C and a discharge current value of 5 C. A value obtained by dividing the 5 C discharge capacity by the initial discharge capacity (0.1 C discharge capacity) and multiplying the quotient by 100 is a 5 C capacity retention rate. The result of measurement for the electrode characteristics is shown in Table 2.

TABLE 2

|  | Initial Discharge Capacity (Ah/kg) | Discharge Capacity Rate (%) | 5 C Capacity Retention Rate (%) |
|---|---|---|---|
| Example 1 | 156 | 93 | 78 |
| Example 2 | 149 | 92 | 85 |
| Example 3 | 148 | 92 | 86 |
| Example 4 | 149 | 91 | 83 |
| Example 5 | 155 | 94 | 88 |
| Example 6 | 159 | 95 | 81 |
| Example 7 | 155 | 95 | 82 |
| Example 8 | 148 | 91 | 80 |
| Example 9 | 154 | 93 | 81 |
| Example 10 | 150 | 90 | 89 |
| Example 11 | 150 | 91 | 88 |
| Example 12 | 158 | 93 | 87 |
| Example 13 | 145 | 87 | 90 |
| Example 14 | 146 | 87 | 91 |
| Example 15 | 143 | 85 | 88 |
| Example 16 | 141 | 84 | 90 |
| Comp. Example 1 | 115 | 72 | 58 |
| Comp. Example 2 | 133 | 82 | 70 |
| Comp. Example 3 | 151 | 90 | 77 |
| Comp. Example 4 | 149 | 90 | 76 |
| Comp. Example 5 | 136 | 81 | 88 |
| Comp. Example 6 | 120 | 71 | 82 |
| Comp. Example 7 | 110 | 66 | — |

TABLE 4

|  | Initial Discharge Capacity (Ah/kg) | Discharge Capacity Rate (%) | 5 C Capacity Retention Rate (%) |
|---|---|---|---|
| Example 17 | 157 | 96 | 91 |
| Example 18 | 158 | 96 | 85 |

Table 2 shows the result of measuring the initial discharge capacity (Ah/kg), the discharge capacity rate (%), and the 5 C capacity retention rate (%) for the positive electrode active materials obtained in Examples 1 to 16 and Comparative Examples 1 to 7. Further, Table 4 shows the result of measuring the initial discharge capacity (Ah/kg), the discharge capacity rate (%), and the 5 C capacity retention rate (%) for the positive electrode active materials obtained in Examples 17 and 18. As an evaluation standard value, the initial discharge capacity is set as 140 (Ah/kg) or more and the 5 C capacity retention rate is set as 78(%) or more. The discharge capacity rate (%) is shown by the ratio of the discharge capacity to the theoretical capacity calculated from each of the compositions.

As illustrated in Table 2 and Table 4, the initial discharge capacity is as high as 140 Ah/kg or higher and also the discharge capacity rate which is the ratio of the actual capacity relative to the theoretical capacity is satisfactory as 84% or higher in Examples 1 to 18. Further, as shown in Table 2 and Table 4, the 5 C capacity retention rate is also as high as 78% and the rate characteristics are high. Further, in Examples 1 to 14 at $2<A/B\leq 5$, the initial discharge capacity is at a high capacity of 145 Ah/kg or more and the discharge capacity ratio is also more preferred as 87% or more. Further, in Examples 2 to 16 at $2.2\leq A/B\leq 7$, the 5 C capacity retention rate is even higher as 80% or more and has higher rate characteristics. Particularly, in Example 17 using Fe, Mg, V as M, the discharge capacity retention rate is particularly preferred as 91%.

On the other hand, in Comparative Examples 1 to 4 at A/B of 2 or less, the particle diameter is large and the 5 C capacity retention rate is as low as 77% or lower. Further, in Comparative Examples 1 and 2 at A/B of less than 1.4, the particle diameter is particularly large and the initial discharge capacity is as low as 135 Ah/kg or less. Further, in Comparative Examples 5 and 6 at A/B at 7 or more, it is considered that the particle diameter is fine but the crystallinity is low and the initial discharge capacity is as low as 140 Ah/kg or less.

Further, in Comparative Example 7, d/D is 1.6 and the crystallinity is low and the initial discharge capacity is as low as 110 Ah/kg.

In view of the results described above, it has been found that the capacity is high and the rate characteristics are also high when the ratio (A/B) of the excess Li-amount to the excess P-amount in the positive electrode active material is $2\leq A/B\leq 7$. Accordingly, it has been shown that the positive electrode active material of the invention has a high capacity and high rate characteristics.

It is expected that the positive electrode for the non-aqueous secondary battery of the present invention is applicable to the power source for mobile bodies or stationary power storage power supplies that require a large-scaled lithium ion secondary battery of high capacity.

What is claimed is:

1. A positive electrode active material for a non-aqueous secondary battery containing a lithium composite oxide having an olivine structure represented by the chemical formula: $Li_{1+A}Mn_xM_{1-X}(PO_4)_{1+B}$ in which
    A>0, B>0, and M represents a metal element,
    M in the chemical formula is one or more of metal elements selected from Fe, Ni, Co, Ti, Cu, Zn, Mg, V and Zr,
    a ratio of A to B in the chemical formula is within a range of: $2<A/B\leq 7$, and
    the value for X is within a range of: $0.75\leq X<1$.

2. The positive electrode active material for the non-aqueous secondary battery according to claim 1,
    wherein the ratio of A to B in the chemical formula is within a range of: $2<A/B\leq 5$.

3. The positive electrode active material for the non-aqueous secondary battery according to claim 1,
    wherein the ratio of A to B in the chemical formula is within a range of: $2.2<A/B\leq 7$.

4. The positive electrode active material for the non-aqueous secondary battery according to claim 1,
    wherein $B\leq 0.15$ in the chemical formula.

5. The positive electrode active material for the non-aqueous secondary battery according to claim 1,
    wherein M in the chemical formula contains V and M', and M' is one or more metal elements selected from Fe, Ni, Co, Ti, Cu, Zn, Mg, and Zr.

6. The positive electrode active material for the non-aqueous secondary battery according to claim 1,
    wherein in the positive electrode active material for the non-aqueous secondary battery, a ratio (d/D) of a particle diameter d to a crystallite diameter D is 1 or more and 1.35 or less.

7. The positive electrode active material for the non-aqueous secondary battery according to claim 6,
    wherein the particle diameter d of the positive electrode active material for the non-aqueous secondary battery is 10 nm or more and 500 nm or less.

8. The positive electrode active material for the non-aqueous secondary battery according to claim 6,
    wherein the particle diameter d of the positive electrode active material for the non-aqueous secondary battery is 30 nm or more and 200 nm or less.

9. The positive electrode active material for the non-aqueous secondary battery according to claim 1,
    wherein a surface of the lithium composite oxide is partially or entirely covered by a carbon material.

10. The positive electrode active material for the non-aqueous secondary battery according to claim 1,
    wherein a carbon content in the positive electrode active material for the non-aqueous secondary battery is 0.5 mass % or more and less than 30 mass %.

11. A method of manufacturing the positive electrode active material of claim 1, comprising the steps of:
    mixing starting materials,
    pre-calcining the mixed starting materials,
    mixing the pre-calcined product and a carbon source, and
    actual-calcining the mixture of the pre-calcined product and the carbon source,
    wherein the actual-calcining temperature in the step of actual-calcining is within a range of a crystallization temperature of the lithium composite oxide or higher and 400° C. above the crystallization temperature or lower, thereby obtaining the positive electrode active material.

12. The method of manufacturing the positive electrode active material according to claim 11,
    wherein the carbon content in the positive electrode active material for the non-aqueous secondary battery is 0.5 mass % or more and less than 30 mass %.

13. A non-aqueous secondary battery having a positive electrode for a non-aqueous secondary battery formed by using the positive electrode active material for the non-aqueous secondary battery according to claim 1.

* * * * *